June 26, 1934.　　T. F. DUFFY　　1,964,428

SAFETY HOOK

Filed Sept. 19, 1932

Thomas F. Duffy
INVENTOR

BY Victor J. Evans & Co.
ATTORNEY

Patented June 26, 1934

1,964,428

UNITED STATES PATENT OFFICE 1,964,428

SAFETY HOOK

Thomas Francis Duffy, Scranton, Pa.

Application September 19, 1932, Serial No. 633,891

1 Claim. (Cl. 24—241)

This invention relates to snap hooks, and its general object is to provide a snap hook that cannot become casually opened under any circumstances but can be manually opened with one hand, in an easy and expeditious manner with very little effort, with the result my hook is extremely useful where a safety snap hook is desired or necessary, such as on a lineman's or window washer's safety belt, where casual opening of the hook may result in the worker falling from a great height, however, such a casualty is impossible when use is made of my hook.

Another object of the invention is to provide a safety snap hook that is reasonably simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figure 1:
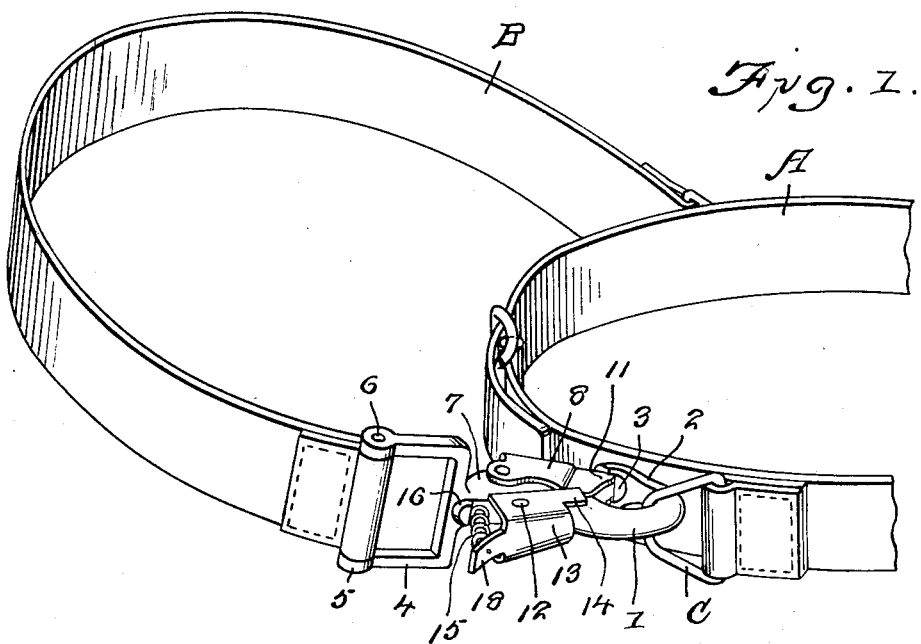
Figure 1 is a perspective view illustrating the use of my hook with a lineman's safety belt.

Referring to the drawing in detail, it will be noted that I have illustrated the use of my hook with a lineman's safety belt, but I want it understood that the hook can be used with any type of safety belt, or on straps, harness, or any place or with any device where a hook of this character is necessary or desired.

The belt forms no part of the present invention and is merely shown to illustrate one use of my hook, and the belt includes a waist encircling portion A and a pole encircling portion B.

The hook includes the shank 1 that has formed therewith in the usual manner, a hook portion 2 which terminates in a recessed end 3, with the recess directed or opening toward the shank 1 and shaped to form a substantially U-shaped terminal.

Formed with the shank 1 and extending rearwardly therefrom is a U-shaped connecting member 4 which has formed with the outer ends of its arms, apertured ears 5 that receive a pin 6 for securing the hook to the pole encircling portion B as clearly shown in Figure 1.

Figure 2:
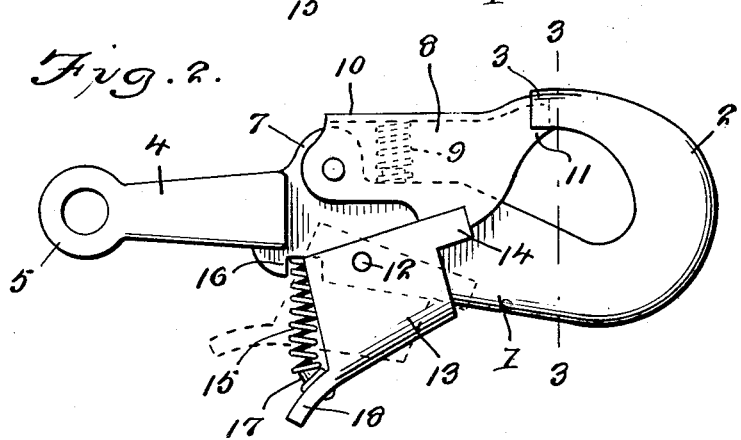
Figure 2 is a side elevation of the hook per se.
Figure 3:
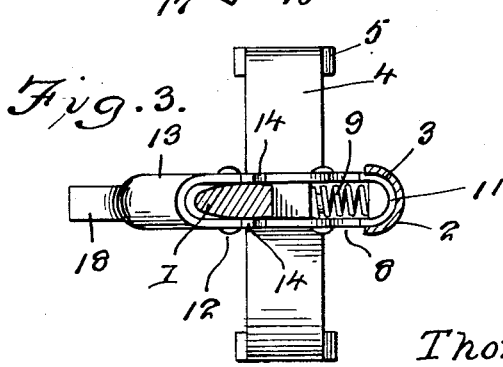
Figure 3 is a sectional view taken approximately on line 3—3 of Figure 2.

The shank 1 has also formed therewith adjacent to the connection of the U-shaped connecting member 4 therewith, an apertured lug 7 which has pivotally secured thereto through the medium of a pin extending through the aperture thereof, a latch member 8 which is hollow and includes side walls that are slidably mounted upon opposite sides of the shank 1 as best shown in Figure 2. The latch member 8 is spring pressed and for this purpose I provide a coil spring 9 that has its end convolutions engaging the adjacent portion of the shank 1 and the outer wall 10 of the latch member. The latch member terminates at its free end in a tongue 11 that is received in the recess 3, and by this construction, it will be obvious that pressure must be applied to the latch member for moving the tongue out of the recess, when it is desired to open the latch member.

While the use of a latch member with a hook is reasonably safe, the means for holding the latch member in contacting engagement with the hook becomes broken or lost, and in that event the latch member is practically useless for the purpose intended, with the result I employ a keeper for the latch member and the keeper must be operated before the latch member can be disposed to open position.

The keeper is preferably formed from a sheet of metal that is rolled upon itself to provide spaced parallel walls which are arranged upon opposite sides of the shank 1 and pivotally secured thereto through the instrumentality of a pivot pin 12. The body of the keeper is indicated by the reference numeral 13 and extending forwardly from the parallel walls of the body are arms 14 which are received in recesses arranged in the opposite walls of the latch member as best shown in Figure 2, and the arms 14 are retained in the recesses through the instrumentality of a coil spring 15 that has one end convolution disposed in the bottom of a notch 16 that is arranged in the shank 1, and its opposite convolution is received by a stud 17 that passes through a curved finger piece 18 that extends outwardly and rearwardly from the body of the keeper.

The usual lineman's belt is provided with a ring C that is secured to the waist encircling portion as shown in Figure 1, and this ring C is adapted to receive the hook as clearly shown in Figure 1.

From the above description and disclosure of the drawing, it will be obvious that I have provided a safety hook that will remain closed under all conditions, but can be easily opened when the occasion demands, merely by pressing upon the finger piece 18 which will release the arms 14 from the recesses of the latch member and the latch member can then be disposed to open position by applying pressure thereto.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A hook comprising a shank provided with a notch, a U-shaped connecting element formed with one end of said shank, a hook portion formed with the opposite end thereof and terminating in a recess shaped to provide a substantially U-shaped terminal, a lug formed on the shank, a spring pressed latch member pivotally secured to said lug and having recessed side walls arranged upon opposite sides of said shank, a tongue formed with the free end of said latch member and receivable in the U-shaped terminal, a keeper pivotally secured to said shank and extending upon opposite sides thereof, oppositely disposed arms formed on one end of said keeper and receivable in the recesses of the side walls, an outwardly curved finger piece formed on and extending centrally from the opposite end of said keeper, a stud extending from the finger piece, and a coil spring having its end convolutions received by the stud and in the notch respectively to urge and retain the arms in the recesses of the side walls to hold the latch member in operative position.

THOMAS FRANCIS DUFFY.